United States Patent
Hernandez, III

(10) Patent No.: US 6,651,241 B1
(45) Date of Patent: Nov. 18, 2003

(54) SCRIPTOR AND INTERPRETER

(75) Inventor: Gaspar Hernandez, III, Andover, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/407,885

(22) Filed: Sep. 29, 1999

(51) Int. Cl.[7] .................................................. G06F 9/44
(52) U.S. Cl. ....................... 717/112; 717/110; 717/115; 717/142; 717/143
(58) Field of Search ................................ 717/110, 112, 717/115, 105, 142, 143

(56) References Cited

U.S. PATENT DOCUMENTS 5,854,930 A * 12/1998 McLain . et al. ........... 370/241
6,269,365 B1 * 7/2001 Kiyoki et al. .................. 707/3

OTHER PUBLICATIONS

Ostrand et al., "A Visual Test Development Environment for GUI Systems", ACM, pp. 82–92, Mar. 1998.*
Aho et al., "Compilers Principles, Techniques, and Tools", Chapter 4—Syntax Analysis, Addison–Wesley Publising, pp. 159–181, 1988.*
Dykes et al., "Towards High–Level Editing in Syntax–Based Editors", Software Engineering Journal, ACM, pp. 237–244, Jul. 1990.*
Balcer et al., "Automatic Generation of Test Scripts from Formal test Specifications", ACM, pp. 210–218, Dec. 1989.*

* cited by examiner

Primary Examiner—Tuan Q. Dam
Assistant Examiner—Ted T. Vo

(57) ABSTRACT

A scriptor and interpreter are disclosed. The scriptor and interpreter each not only check the syntax of a command in a script, but also that the values for the variables passed as arguments to command are consistent with the values attributed to those variables in preceding portions of the script.

28 Claims, 4 Drawing Sheets

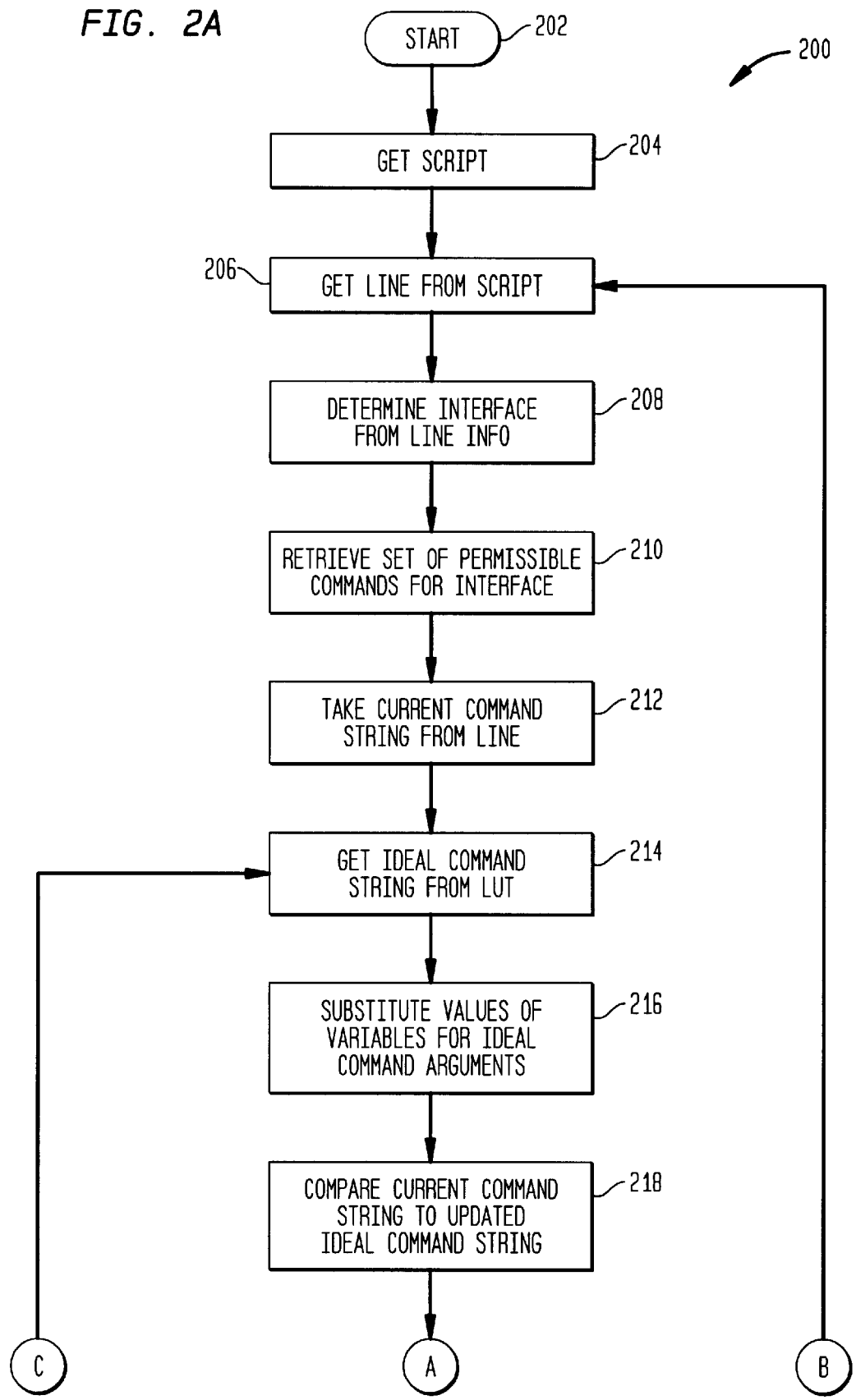

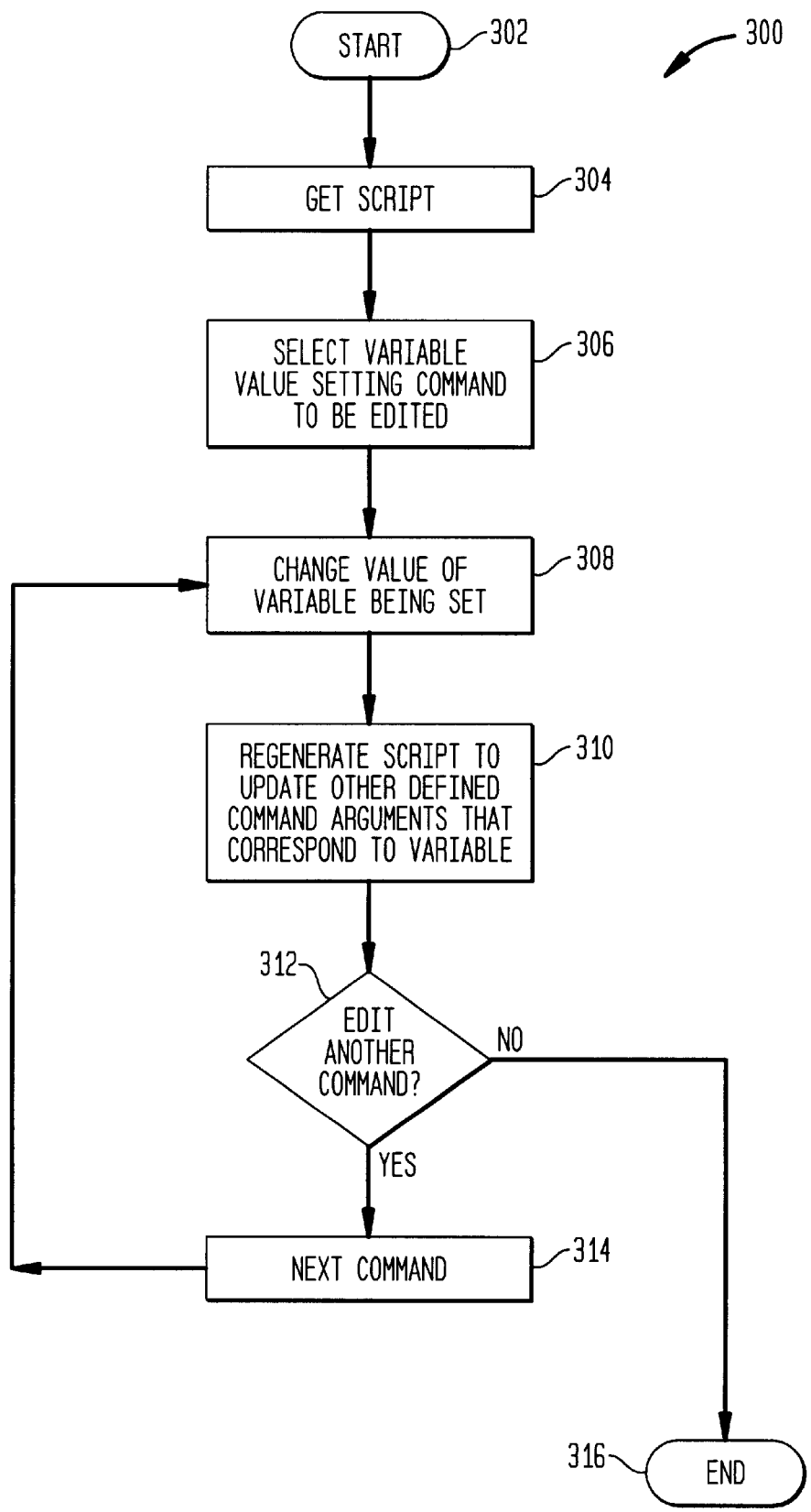

SCRIPTOR AND INTERPRETER

FIELD OF THE INVENTION

The invention is directed toward the field of scriptors and interpreters, and more particularly to a scriptor and an interpreter that check both syntax and whether values for variables have been recited/used consistently throughout the script.

BACKGROUND OF THE INVENTION

A script is a sequence of commands that are to be interpreted, i.e., executed by a program running on a processor, as contrasted with a program that is compiled into machine code of a processor and then directly executed by the processor. Such a programmed processor that interprets a script is typically referred to as an interpreter. A script can be generated using a text editor. As an alternative, it is known to provide a graphical user interface (GUI) that permits a user to write a script by assembling commands and their arguments from pull-down menus. Such a GUI for scripting is typically referred to as a scriptor.

Scriptors and interpreters that check the syntax of the commands are known. Such syntax checking is limited to (1) verifying that command is a valid command, and (2) confirming that a required argument for the command is present.

As an example, a script written in the Wireless Automation Manager Interface Language (WAMIL), that is the subject of a co-pending application, will be considered after a general discussion concerning wireless technology. The general discussion of wireless technology is presented to ensure and appreciation of the context of this script, and others, that will follow.

Large systems often include monitoring systems that permit one or more users to monitor the performance of the system in general, and to specifically monitor the state of one or more parameters of the large system. In some instances, the manner in which the monitoring system delivers information to the user can be a burden.

An example of the large system discussed above is a wireless communication network that provides wireless communications service to a wireless unit that is situated within a geographic region. A Mobile Switching Center (MSC) is responsible for, among other things, establishing and maintaining calls between wireless units and calls between a wireless unit and a wireline unit. As such, the MSC interconnects the wireless units within its geographic region with a public switched telephone network (PSTN). The geographic area serviced by the MSC is divided into spatially distinct areas called "cells." In a schematic block diagram, each cell could be schematically represented by one hexagon in a honeycomb pattern. But, in practice, each cell has an irregular shape that depends on the topography of the terrain surrounding the cell. Typically, each cell contains a base station, which comprises the radios and antennas that the base station uses to communicate with the wireless units in that cell. The base stations also comprise the transmission equipment that the base station uses to communicate with the MSC in the geographic area via communication links. One cell site may sometimes provide coverage for several sectors. Here, cells and sectors are referred to interchangeably.

In a wireless cellular communications system, a base station and a wireless unit communicate voice and/or data over a forward link and a reverse link, wherein the forward link carries communication signals over at least one forward channel from the base station to the wireless unit and the reverse link carries communication signals on at least one reverse channel from the wireless unit to the base station. There are many different schemes for determining how wireless units and base stations communicate in a cellular communications system. For example, wireless communications links between the wireless units and the base stations can be defined according to different radio protocols, including time-division multiple access (TDMA), Frequency Division Multiple Access (FDMA), Code Division Multiple Access (CDMA) and others.

Within the geographic region, the MSC switches a call between base stations in real time as the wireless unit moves between cells, referred to as a handoff. Currently, in FDMA, TDMA, CDMA and GSM, cell site planning to determine the geographic coverage for a cell is a manually intensive task that needs constant adjustment. In planning a cell, the topology of the geographic area and a suitable antenna site is selected based on availability and zoning rules. Such a selection is typically not optimal but adequate. Drive tests and manually collecting signaling data are then performed mostly on the perimeter of the coverage area. Transmit and receive antennas and power are then adjusted in a manually iterative manner to improve the call quality. Sometimes, frequencies are swapped with neighbor cells and/or transmit power is readjusted to improve the coverage. Over time, the cell site engineers review customer complaints and cell site dropped call reports and again try to manually optimize the RF performance.

Lucent Technologies Inc. has developed a monitoring system that a user can use to change parameters of the wireless communication system as well as to extract data about it. This monitoring system can generate the TIpdunix (TI) interface, the Status Display Page (SDP) interface and/or the AUTOPLEX Recent Change & Verification Database (APXRCV) interface. These interfaces can be used individually. But typically, information extracted from one of the interfaces is used to make a decision to use a second one of the interfaces in one way or another. To use an interface, a user must start a discrete process. In a windows-based enviroment, each interface session has its own window.

Example Script No. 1 follows.

| | Script No. 1 |
|---|---|
| Line | Command |
| 01 | WAM:MSC 5 |
| 02 | WAM:CELL 123 |
| 03 | WAM:BBA 8 |
| 04 | WAM:CONNECT TI |
| 05 | TI:op:cell 101, BBA 8 |
| 06 | WAM:DISCONNECT TI |
| 07 | WAM:ENDTEST |

In line 2, the variable CELL is set to value 123. Embedded in line 5 is the operations command, op, of the known Tipdunix Interface (TI). The complete embedded command is op:cell 101, BBA 8. It operates on cell 101. But this is different than the value to which the global variable CELL was set in line 2 (namely the value 123). A known scriptor or interpreter would not consider this to be a bug/error in a script. Because this is merely an operations command that retrieves status information, the discrepancy between the value of cell in line 2 and cell identified in line 5 is harmless.

But if the embeded command in line 5 had been a diagnostics command, dgn, this could potentially be a very big problem. No calls can be carried by a cell during the diagnostics procedure. Plus, once diagnostics are initiated, a cell refuses to carry new calls. And, the actual testing procedures cannot begin until all calls (existing at the time that the diagnostics was requested) terminate. The lengths of time it takes for such calls to end varies depending upon the nature of the conversation taking place in those calls. Only after the diagnostics is over can the cell take new calls again.

Line 2 of Script No. 1 indicates that the cell intended to be operated upon is 123. But line 5 inconsistently operates upon a different cell, namely 101. If a person made plans to perform diagnostics on cell 123, then many users would be upset and/or inconvenienced if diagnostics were performed inadvertently on cell 101.

Known scriptors and interpreters cannot identify such inconsistent setting of variable value. Unfortunately, such inconsistencies within a script are relatively common, especially where the script is lengthy or where a user has edited an existing script without realizing the need to propagate his change throughout the script.

Scripting languages and their use are not exclusive to wireless technology. Suppose a script was written in an appropriate language for the banking industry. An analogous error to that discussed above concerning Script No. 1 would be if line 2 set the value for the variable ACCOUNT to 567 while line 5 transferred money into account 568. The owner of account 568 might be happy, but the owner of account 567 (who was the intended recipient of the transfer, as evidenced by line 2) would be upset at the least.

SUMMARY OF THE INVENTION

The invention is, in part, a recognition of the need to check not only the syntax of commands in a script, but also the need to check for the consistent use of variables throughout a script. The invention, among other things, solves the problems identified by the inventor to exist in the Background Art.

The invention, in part, provides a method (and the associated program and programmed device) for processing an at least partially-completed script having at least one command, wherein the method checks syntax and argument consistency. Such a method comprises: a) providing a current command to be evaluated from the script, the command having a current argument; b) generating an ideal command from a set of permissible commands, the ideal command having a ideal argument that is consistent with preexisting values of variables identified in the script; c) comparing the current command against the ideal command; d) returning, if the step c) results in a match, to the step a) using a second command from the script; and e) repeating, if the step c) does not result in a match, the steps b) and c) for additional ideal commands until a match is found or until the set of permissible commands has been exhausted. Also, such a method can additionally include: f) returning, if a match is found via the step e), to the step a) using a second command from the script.

The invention also, in part, provides a method (and the associated program and apparatus) of editing a script having a sequence of commands. Such a method comprises: a) providing a script; b) selecting a command to be edited from the script, the selected command having an associated argument that sets the value of a variable; c) updating the associated argument of the selected command to change the value of the variable; wherein the script includes a second command that has a defined argument that corresponds to the variable but that which does not equal the updated value of the variable; and d) regenerating the script to update the defined argument to equal the updated value of the variable.

The invention also, in part, provides, a method (and the associated program and apparatus) of interpreting each command in a script having a sequence thereof written in a high-level scripting language, wherein the method checks syntax and argument consistency. Such a method comprises: a) providing a current command to be evaluated from the script, the command having a current argument; b) generating an ideal command from a set of permissible commands, the ideal command having a ideal argument that is consistent with preexisting values of variables identified in the script; c) comparing the current command against the ideal command; d) executing, if the step c) results in a match, the current command; e) returning, if the step c) results in a match, to the step a) using a second command from the script; f) repeating, if the step c) does not result in a match, the steps b) and c) for additional ideal commands until a match is found or until the set of permissible commands has been exhausted; and g) executing, if a match is found via the step f), the current command. Such a method can also include: h) returning, if a match is found via the step f), to the step a) using a second command from the script.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus do not limit the present invention.

FIGS. 2A and 2B constitute a flow chart depicting the steps carried out to perform syntax and variable value consistency checking by an embodiment of the scriptor and an embodiment of the interpreter according to the invention;

FIG. 3 is a flow chart depicting steps taken by an embodiment of scriptor according to the invention to prorogate changes throughout an existing script.

DETAILED DESCRIPTION OF PREFERRED EMBODIMENTS

Figure 4:
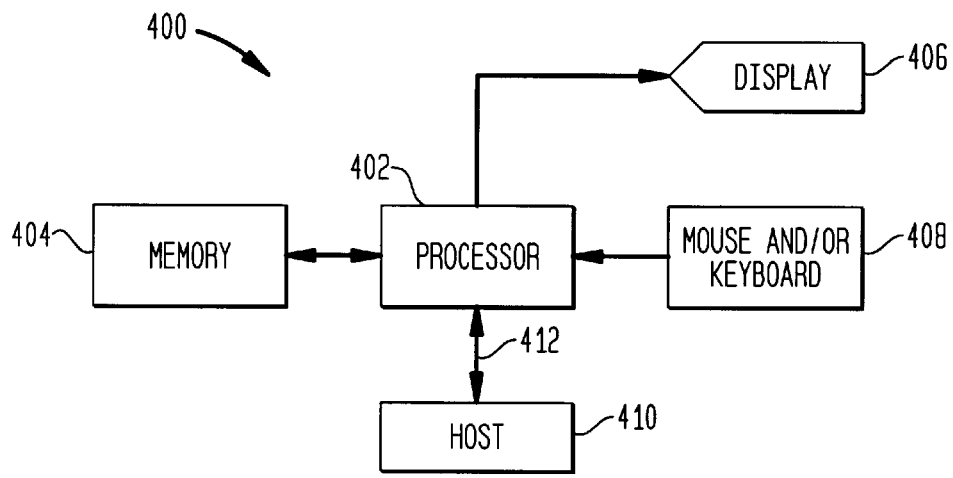
FIG. 4 is a schematic depiction of a hardware embodiment of the scriptor and/or interpreter according to the invention.

A scriptor and/or interpreter according to the invention is preferably implemented as in the example schematic depiction of FIG. 4, which takes the form of a programmed system 400 that includes a processor 402, a video display device (VDD) 406, a user input device 408 such as a mouse and/or keyboard and a memory device 404. The memory 404 stores one or more programs or scripts that cause the processor 402 to generate the scriptor and/or interpreter according to the invention. Embodiments of the invention, for example, have been written in two languages, the Tool Command Language (TCL) and C.

The computer-readable memory 404 can include RAM, ROM, a fixed hard disk drive, and/or a removable storage medium for a non-fixed disk drive such as a floppy disk or a CDROM. The program which causes the processor 402 to generate the scriptor and/or interpreter according to the invention can be downloaded to the processor 402 from a remote host 410 over an optional connection 412. As the program is downloaded through the optional connection 412, the computer-readable medium in which the program is embodied takes the form of a propagated signal.

Generation of the scriptor and/or interpreter according to the invention involves many sorting and comparison operations as well as accesses to look-up tables (LUTs). As such, the processor 404 should be of sufficient processing power to assure reasonably quick results. Examples of adequate processors are those from the Pentium family of processors marketed by Intel Inc.

The scriptor and interpreter according to the invention can be tailored to work with a great many languages. They are especially well-suited to the Wireless Automation Manager Interface language (WAMIL) that is the subject of a first co-pending application. WAMIL language includes commands, if-construct elements and while-construct elements. A WAMIL command has the format of "interface:command," e.g., "TI:OP:CELL ARGUMENT," "WAM:CONNECT SDP," or "WAM:GETSDP." In other words, a WAMIL command has a first field that identifies an interface and a second field that identifies a command. The first field actually identifies the interface in which the command of the second field is valid. Preferably, the first field precedes, or is a header for, the second field and is separated by an alphanumeric character such as a colon.

The embodiment of the WAMIL language discussed here is a specific embodiment of the Wireless Automation Manager Interface Language (WAMIL). It is noted that many variations of the WAMIL language, having different combinations of commands, IF-construct elements and (optionally) WHILE-construct elements, could embody the scripting language for which the scriptor and interpreter according to the invention can be tailored to work.

Details of the WAMIL language are contained in the first co-pending U.S. patent application, entitled "Multiple Interface Scripting Language," by the same inventor, Gaspar Hernandez, III, filed on the same date, Sep. 29, 1999, that is assigned to the same assignee, Lucent Technologies Inc. The entire contents of this first co-pending application are hereby incorporated by reference.

One of the commands listed in the first copending application is the "GETSDP" command. Details of this command can be found in a second copending U.S. patent application, entitled "Technology to Translate Non-Text Display Generation Data Representing An Indicator Into Text Variables," by the same inventor, Gaspar Hernandez, III, filed on the same date, Sep. 29, 1999, that is assigned to the same assignee, Lucent Technologies Inc. The entire contents of this second copending application are hereby incorporated by reference.

Details of a preferred context in which to use scripts written in the WAMIL language are contained in a third co-pending application, entitled "Liaison Interface," by the same inventor, Gaspar Hernandez, III, filed on the same date, Sep. 29, 1999, that is assigned to the same assignee, Lucent Technologies Inc. The entire contents of this third co-pending application are hereby incorporated by reference.

The interpreter according to the invention can be executed from a command line or by way of a graphical user interface (GUI). Details of a graphical user interface (GUI) to ease the burden on a user represented by command line execution are contained in a fourth co-pending application, entitled "Command Line Generator," by the same inventor, Gaspar Hernandez, III, filed on the same date, Sep. 29, 1999, that is assigned to the same assignee, Lucent Technologies Inc. The entire contents of this fourth copending application are hereby incorporated by reference.

WAMIL Scriptor Interface Process Requirements

The WAMIL (Wireless Automation Manager Interface Language) scriptor interface allows a user to generate WAMIL test scripts which can be saved and then executed as automated test scripts. The WAMIL test scripts can be generated, e.g., via WAMIL commands selected from a graphical scriptor Interface pull down menus.

WAMIL Script Generation Process

To create a new WAMIL test script, a user simply selects the desired WAMIL commands from the WAMI scriptor interface pull down menus, one at a time, and then upon completion, saves the completed script in the user's home directory, or WAMI SHARE sub-directory, or anywhere else under a specified filename which is entered by the user in the WAMIL script text entry box. As WAMIL commands are selected from the pull down menus, they are added to the TEST SCRIPT list box, in sequential order. Each time a WAMIL command is added to the TEST SCRIPT list box, a unique line number appears before the command. To save the completed WAMIL script, the user then simply selects the save WAMIL script command button.

All WAMIL scripts created by a user should (in this WAMIL embodiment) have the extension wamil. For example a WAMIL script file called jt1242 will be saved as jt1242.wamil. Scriptor automatically adds the extension, ".wamil".

The WAMIL scriptor interface pull down menus support all APX, SDP, WAM, and TI interface commands. Each pull down menu allows a user to select and structure a specific WAMIL command.

WAMIL Script Example

An example WAMIL script follows.

| Line | Command |
| --- | --- |
| 01 | WAM:INITIALIZE |
| 02 | WAM:PRINT Test Case: jt1242 |
| 03 | WAM:DATE |
| 04 | WAM:TIME |
| 05 | WAM:MSC 5 |
| 06 | WAM:CELL 101 |
| 07 | WAM:CCC 23 |
| 08 | WAM:GETAPX backup cell2 |
| 09 | WAM:PUTAPX cells jt1242 |
| 10 | WAM:EXEC SHARE initscript |
| 11 | WAM:CONNECT TI |
| 12 | IF:LFAIL |
| 13 | THENDO: |
| 14 |   WAM:ENDTEST |
| 15 | ELSDO: |
| 16 | ENDIF: |
| 17 | TI:op:cell 101, ccc 23 |
| 18 | IF:COMPLETED |
| 19 | THEN:CONTINUE |
| 20 | ELSE:WAITQUERY 10 TI 5 |
| 21 | IF:OMSG:CCC 23 ACTIVE |
| 22 | THENDO |
| 23 |   WAM:EXEC SHARE |
| 24 | ELSEDO: |
| 25 |   WAM:PUTAPX cell2 backup |

-continued

| Line | Command |
|------|---------|
| 26 | ENDIF: |
| 27 | WAM:ENDTEST |

In line 1, the WAMIL script will first initialize all the WAMI variables to their initial states. The script will then print (line 2) the text, Test Case: jt1242 to the WAMIL script report file, print (lines 3–4) the date and time to the report file, set (lines 5–7) the mobile switching center variable, MSC, to 5, the cell variable, CELL, to 101, and the variable, CCC to 23.

Next, the WAMIL script will save (line 8) the MSC 5, cell 101 cell2 DB forms in the user's home output sub-directory under the master DB filename, backup, and then (in line 9) restore (download) a new version of the cell2 DB form via the APXRCV interface, from the user's home output sub-directory, using the master DB file jt1242.

The script will then execute (line 10) the WAMIL script initscript, which is located in the WAMI SHARE wam.wamil sub-directory. Upon completion of the WAMIL initscript execution, the WAMIL script will then attempt (line 11) to connect to the TI interface. If the attempt is successful, the script will continue (line 17) to the next WAMIL command. If the attempt is unsuccessful, the script will end the test at line 14.

Once a connection to the TI interface is established, the WAMIL script will execute (line 17) the TI op:cell 101, ccc 23 command, and wait for a response. If a COMPLETED output message is received from the TI interface, the script will continue (line 19) to the next WAMIL command. If the COMPLETED output message is not received, the script will (line 20) wait 10 seconds and query the TI interface for an output message up to 5 times. The WAMIL script will continue to query the TI interface every 10 seconds up to 5 times until a COMPLETED output message is received, or the amount of times has been reached.

When the COMPLETED output message is received, the WAMIL script will then test (line 21) the output message to determine if CCC 23 is ACTIVE. If the CCC is ACTIVE, the script will execute (line 23) the WAMIL script jt1243, located in the WAMI SHARE wam.wamil sub-directory, and then end (line 27) the test. If the CC is not ACTIVE, the script will restore (line 25) the cell2 DB form, saved at the beginning of the script, from the master DB file backup, and then end (line 27) the test.

Check WAMIL Script Syntax and Variable Consistency Function

A user can check the syntax of a WAMIL script currently loaded into the SCRIPTOR TEST SCRIPT list box at any time. Although scripts generated from the WAMIL scriptor interface pull down menus are syntax error free, this feature exists as a function for users who have inserted specific WAMIL commands through the use of the WAMIL scriptor interface command insertion feature.

To check the syntax and variable consistency of the currently loaded script, the user simply selects the Check Script syntax command button and the Wireless Automation Manager (WAM) interpreter (WAMI) will check the syntax of every line in the script for any errors which would cause an abort or failure of the script during execution.

If a syntax error is found in the script, the WAMI will display an appropriate error message that includes of the script line number, and WAMIL command, in which the syntax error was found.

A syntax error check by the WAM interpreter also includes verification that a script includes key WAMIL commands needed for successful execution. For example, WAMIL commands in which the MSC and cell number are set must (for this particular embodiment of WAMIL) be included in a WAMIL script, otherwise the interpreter will assume the current cell, or MSC number, defined in the WAMI is the value used to expand a specific interface command. Thus, if the cell number in an interface command differs from the current cell number defined in the WAMI, a syntax error will occur. In other words, the interpreter, and also the scriptor, check both syntax and variable values consistency, i.e., the use/recitation of variables in the script in a consistent manner.

The syntax and variable values consistency check will be discussed in more detail later.

Select WAMIL Command Function

A user can select and edit any WAMIL command from the currently loaded WAMIL script in the SCRIPTOR TEST SCRIPT list box. To edit a WAMIL command, a user simply double-clicks on a command and the command is displayed in the Current Command selected text entry box. The user can then edit the command as desired and replace the selected command with the new edited command.

If the newly edited command has a syntax error, the WAMI will display an error message showing an explanation of the error, and the selected command in the TEST SCRIPT list box will not be replaced.

The WAMIL scriptor interface can allow only existing commands to be replaced with the same type command. The WAMIL scriptor interface will not allow a user to replace an existing command with a different type edited command.

WAM Interpreter Process Requirements

Figure 1:
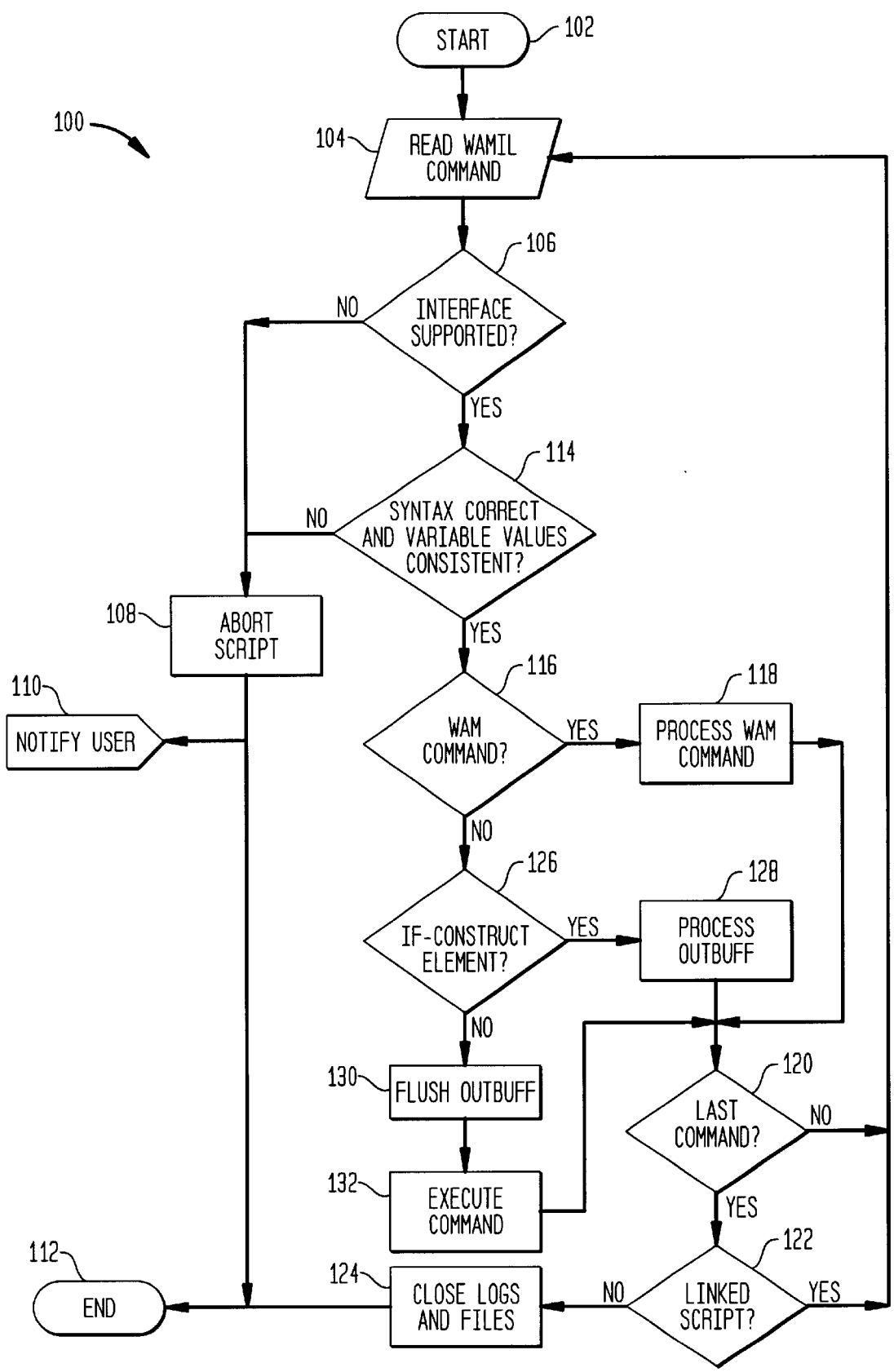
FIG. 1 is a flow chart generally depicting the process steps carried out by an embodiment of the interpreter according to the invention.

FIG. 1 is a flow chart generally depicting the process steps carried out by an embodiment of the interpreter according to the invention.

The WAM interpreter will start at step 102 of FIG. 1 and then will read in a WAMIL command from a WAMIL script file at step 104. A WAMIL script file will preferably have the extension .wamil added to the filename. For example, a script file called jt1242 will be saved with the filename jt1242.wamil. all (for this particular embodiment of WAMIL) WAMIL script files generated by a user will preferably be stored under the WAMI wam.wamil user sub-directory (known as Home to WAMI) or can be saved anywhere else.

A WAMIL line will include a WAMIL command such as an interface command or an element of an if-construct or while-construct. The interpreter reads and executes one WAMIL command at a time, from a WAMIL script file.

At step 106, if the command is an interface command rather than an element of an if-construct, it is determined if the interface corresponding to the command is supported. If not, flow proceeds to step 108, where the script is aborted. Then, flow proceeds to step 110, where the user is notified or warned that the script has been aborted and to the end step 112. But if the interface is supported, flow proceeds to step 114.

At step 114, the syntax, as well as variable consistency, are checked. If incorrect, then flow proceeds to step 108, etc. But, if the syntax and variable values are correct, and the command is recognized as a WAMI interface command at decision step 116, or is not recognized as an if-construct element at decision step 126 thereby impliedly determining the command to be an interface command for a non-WAMI interface, then the WAM interpreter will send the corresponding command to the interface at steps 130 and 132, respectively, and wait for its execution to be completed (at which point flow proceeds to step 120). The WAM interpreter will support WAMIL commands for at least the following interfaces: TI Interface (The TIpdunix Interface); SDP Interface (The Status Display Page Interface); APX Interface (The APXRCV Interface); and WAMI Interface (internal WAM platform commands).

Again, if the interface command syntax and variable values consistency is invalid at step 114, or the interface is not supported at step 106, the WAM interpreter will abort the script at step 108 and notify the user at step 110 of the WAMIL script line number where the syntax, or interface error, occurred.

Upon the execution of the WAMIL interface command at step 132, the interpreter's OutBuff buffer will hold the interface output from the interface session. The contents of the OutBuff will remain unchanged until another TI, SDP, or APX WAMIL command is executed, or a WAM platform command to flush the buffer is executed. Prior to the execution of any (in this WAMIL embodiment) TI, SDP, or APX WAMIL command, the OutBuff is always flushed.

Upon successful execution of the WAMIL command, OutBuff is then processed as follows: a) If the next WAMIL command to be executed (at step 132) is also a TI, or SDP, command, OutBuff is flushed at step 130; b) If the next WAMIL command to be executed is a WAM platform command, other than a WAM platform command to flush the buffer (as determined at step 116), the WAM command is executed and OutBuff remains unchanged; and c) If the next WAMIL command to be executed is a WAMIL IF command construct (as determined at step 126), the contents of Out-Buff are processed (at step 128).

Upon completion of the WAMIL script, the WAM interpreter preferably always does the following (at step 124): a) Close all WAMI interface connections which have been opened during the WAMIL script execution; b) Finish appending any data to the WAMIL I/O log file for the script, and close and save the file as the script report; c) Finish appending any log data to an OutBuff redirection file, if one has been created for the script, and close the file; and d) Flush OutBuff.

Once the WAMIL script has been completed (as determined by step 120), the WAMI will return to its idle state, unless a series of WAMIL scripts have been linked together for execution (as determined at step 122), at which point the WAM interpreter will start the execution of the next WAMIL script in the linked list.

WAM Interface Language (WAMIL) Requirements

This section reiterates the WAMIL (WAM Interface Language) command structure and syntax.

The format of a WAMIL interface command shall be as follows:

TI:op:cell, generic

The text string, TI, denotes the interface to which the command corresponds, and the remaining syntax after the colon is the specific embedded interface command. The WAMI will support an interface language at least for each of the following interfaces: the TI Interface (TIpdunix Interface); the Status Display Page (SDP) interface; the APX Interface (APXRCV Interface); and the WAMI Interface (internal WAMI platform commands).

WAMIL TI Interface Commands Requirements

A WAMIL TI interface command shall be structured as follows:

TI:op:cell, generic

The WAM interpreter supports all TIpdunix related TI commands. The TI commands shall be generated per user configuration settings. For example, if a user has selected cell 93 and CCC 2, or set these parameters via WAMI platform commands, then the command op:cell x, ccc y is generated as follows:

TI:op:cell 93, ccc 2

WAMI Platform Interface Commands Requirements

This section describes the WAMI platform interface commands which can be used in WAMIL scripts to change script variables, input/output parameters, and script looping techniques.

A WAMI platform interface command shall be structured as follows:

WAM:CELL 93

Where CELL is and example WAMI interface command and the value of 93 is an example of the command argument. The WAM interpreter shall support all WAMI platform interface commands for any (in this WAMIL embodiment) existing WAM variable, input/output process, file selection process, and data redirection process.

The following is a list of WAM interface commands:

| WAM COMMAND: | PURPOSE: |
| --- | --- |
| WAM:ADDCE value | Changes the WAM global number of channel elements to add variable, ADDCE, to the value provided as an argument. |
| WAM:ADRS value | Changes the WAM global memory address number variable, ADRS, to the value provided as an argument. |
| WAM:ANT value | Changes the WAM global antenna face variable, ANT, to the value provided as an argument. |
| WAM:ANTVAR | Declares to the WAM Interpreter, that a value for the WAM VAR variable ANTVAR will be supplied to the script. |
| WAM:APXVAR promptstring | Declares to the WAM Interpreter, that a value or string for the WAM VAR variable APXVAR will be supplied to the script. |
| WAM:AU value | Changes the WAM global cell amplifier unit number variable, AU, to the value provided as an argument. |
| WAM:BBA value | Changes the WAM global BCR-BIU-ACU trio variable, BBA, to the value provided as an argument. |
| WAM:BBALIST value | Declares to the WAM Interpreter, that a list of WAM VARn BBA numbers will be supplied to the script. |

-continued

| WAM COMMAND: | PURPOSE: |
| --- | --- |
| WAM:BBAVAR | Declares to the WAM Interpreter, that a value for the WAM VAR variable BBAVAR will be supplied to the script. |
| WAM:BBAVARn | Instructs the WAM interpreter to set the WAM global BBA variable to the value of the referenced WAM VARn BBA variable, in position n, of the BBA List passed as an argument. |
| WAM:CAT value | Changes the WAM global clock and tone board number variable, CAT, to the value provided as an argument. |
| WAM:CATLIST value | Declares to the WAM Interpreter, that a list of WAM VARn CAT numbers will be supplied to the script. |
| WAM:CARVARn | Instructs the WAM interpreter to set the WAM global CAT variable to the value of the referenced WAM VARn CAT variable, in position n, of the CAT List passed as an argument. |
| WAM:CCC value | Changes the WAM global CDMA Cluster Controller number variable, CCC, to the value provided as an argument. |
| WAM:CCCLIST value | Declares to the WAM Interpreter, that a list of WAM VARn CCC numbers will be supplied to the script. |
| WAM:CCCVAR | Declares to the WAM Interpreter, that a value for the WAM VAR variable CCCVAR will be supplied to the script. |
| WAM:CCCVARn | Instructs the WAM interpreter to set the WAM global CCC variable to the value of the referenced WAM VARn CCC variable, in position n, of the CCC List passed as an argument. |
| WAM:CCU value | Changes the WAM global CDMA Channel Unit number variable, CCU, to the value provided as an argument. |
| WAM:CCULIST value | Declares to the WAM Interpreter, that a list of WAM VARn CCU numbers will be supplied to the script. |
| WAM:CCUVAR | Declares to the WAM Interpreter, that a value for the WAM VAR variable CCUVAR will be supplied to the script. |
| WAM:CCUVARn | Instructs the WAM interpreter to set the WAM global CCU variable to the value of the referenced WAM VARn CCU variable, in position n, of the CCU List passed as an argument. |
| WAM:CDMADPC value | Changes the WAM global BCR-BIU-ACU power control option number variable, CDMADPC, to the value provided as an argument. |
| WAM:CE value | Changes the WAM global Channel Element number variable, CE, to the value provided as an argument. |
| WAM:CELL value | Changes the WAM global cell number variable, CELL, to the value provided as an argument. |
| WAM:CELLVAR | Declares to the WAM Interpreter, that a value for the WAM VAR variable CELLVAR will be supplied to the script. |
| WAM:CGSA value | Changes the WAM global cellular geographic service area number variable, CGSA, to the value provided as an argument. |
| WAM:CLOSE filename | Causes the WAM Interpreter to stop saving OutBuff to the filename provided as an argument, and close the file. |
| WAM:COMMENT string | Adds a comment line to the WAMIL script.. |
| WAM:CONFIG value | Changes the WAM global cell configuration option number variable, CONFIG, to the value provided as an argument. |
| WAM:CONNECT interface | Instructs the WAM Interpreter to initiate a connection to the interface specified as an argument. |
| WAM:CREATEVAR newvarname | Instructs the WAM Interpreter to create a new VAR variable provided by the argument newvarname. |
| WAM:CSC value | Changes the WAM global cell site controller variable, CSC, to the value provided as an argument. |
| WAM:CSCVAR | Declares to the WAM Interpreter, that a value for the WAM VAR variable CSCVAR will be supplied to the script. |
| WAM:DATE | Prints the current system date in the WAMIL report file. |
| WAM:DCCH value | Changes the WAM global dedicated/digital control channel number variable, DCCH, to the value provided as an argument. |
| WAM:DCS value | Changes the WAM global digital cellular switch number variable, DCS, to the value provided as an argument. |

-continued

| WAM COMMAND: | PURPOSE: |
|---|---|
| WAM:DECR globalvariable value | Instructs the WAM Interpreter to decrement the WAM global variable provided, by the value given. |
| WAM:DECRVAR varvariable value | The DECRVAR command instructs the WAM Interpreter to decrement the WAM VAR variable provided as an argument by the value given. |
| WAM:DELCE value | Changes the WAM global number of channel elements to delete variable, DELCE, to the value provided as an argument. |
| WAM:DISCONNECT interface | Instructs the WAM Interpreter to disconnect from the interface given, and terminate all (for this particular embodiment of WAMIL) its associated processes. |
| WAM:DISPLAY seconds | Instructs the WAM Interpreter to open an xterm window which allows a user to monitor the WAMIL script progress. |
| WAM:DL value | Changes the WAM global cell site data link number variable, DL, to the value provided as an argument. |
| WAM:DSI value | Changes the WAM global digital service 1 variable, DS1, to the value provided as an argument. |
| WAM:ECP value | Changes the WAM global executive cellular processor number variable, ECP, to the value provided as an argument. |
| WAM:EMAIL string | Instructs the WAM Interpreter to email the string provided as an argument to the user. |
| WAM:EMAILRPT | Instructs the WAM Interpreter to email the entire WAMIL report file to the user after the script execution has been completed or terminated. |
| WAM:ENDTEST | Instructs the WAM Interpreter to terminate the WAMIL script. |
| WAM:EXEC path wamilscript | Instructs the WAM Interpreter to execute the WAMIL script provided as an argument. |
| WAM:FLUSHBUFF | Instructs the WAM Interpreter to flush OutBuff. |
| WAM:FLUSHIP | Instructs the WAM Interpreter to flush OutBuff up to the next incoming IP output message of the TI interface messages. |
| WAM:FLUSHTAGS | Instructs the WAM Interpreter to flush the internal TAGS FIFO buffer. |
| WAM:GEN value | Changes the WAM global generic load number variable, GEN, to the value provided as an argument. |
| WAM:GENVAR | Declares to the WAM Interpreter, that a value for the WAM VAR variable GENVAR will be supplied to the script. |
| WAM:GETAPX dbformname dbfilename | Instructs the WAM Interpreter to save the APXRCV DB form provided as an argument. |
| WAM:GETAPXFLD dbformname dbfilename | Instructs the WAM Interpreter to get the APXRCV DB form field name, provided as an argument, and set the WAMI VAR variable APXVAR to the field value. |
| WAM:GETCELLS | Instructs the WAM Interpreter to retrieve all (for this particular embodiment of WAMIL) the cell numbers for the current MSC. |
| WAM:GETGEN | Instructs the WAM Interpreter to retrieve the generic value for the current cell number and set the WAM global variable GEN to that value. |
| WAM:GETLISTVAR varvariable varlisname index | Instructs the WAM Interpreter to assign the WAM VARn List, varlistname, variable value, in the position indicated by the argument index, to the WAM VAR variable varvariable |
| WAM:GETROP rangepattern | Instructs the WAM Interpreter to retrieve all (for this particular embodiment of WAMIL) the ROP information specified by the arguments. |
| WAM:GETSDP indicatorname | Retrieves an indicator STATE, COLOR, and VALUE from the current SDP in the WAMI OutBuff for the WAMI global variable associated with the indicator name, SDPVAR, provided as an argument. |
| WAM:GET_1 varvariable index string | Instructs the WAM Interpreter to assign to varvariable the value located in position index relative to the string provided. |
| WAM:INCR globalvariable value | Instructs the WAM Interpreter to increment the WAM global variable provided, by the value given. |
| WAM:INCRVAR varvariable value | The INCRVAR command instructs the WAM Interpreter to increment the WAM VAR variable provided as an argument by the value given. |
| WAM:INITIALIZE | Sets all (for this particular embodiment of WAMIL) WAM global variables to an initial state. |
| WAM:INPUT filename | Replaces the WAM Interpreter OutBuff with the contents of filename. |

-continued

| WAM COMMAND: | PURPOSE: |
|---|---|
| WAM:LAC value | Changes the WAM global linear amplifier circuit number variable, LAC, to the value provided as an argument. |
| WAM:LAUNCH path wamilscript-switch . . . | Instructs the WAM interpreter to launch the WAMIL script provided as argument. |
| WAM:LC value | Changes the WAM global locate radio number variable, LC, to the value provided as an argument. |
| WAM:LMT value | Changes the WAM global lightwave microcell transceiver number variable, LMT, to the value provided as an argument. |
| WAM:LOOPCELL cells . . . | Instructs the WAM Interpreter to execute the entire WAMIL script once per cell number provided in the command arguments. |
| WAM:LOOPCELLVAR | Instructs the WAM Interpreter to execute the entire WAMIL script once per cell number supplied to the script. |
| WAM:MATHVAR varvariable operator value | Causes the WAM Interpreter to perform simple mathematics, per the type of operator provided, on the WAMI VAR variable provided by the argument varvariable. |
| WAM:MICROCELL value | Changes the WAM global rcs number variable, MICROCELL, to the value provided as an argument. |
| WAM:MSC value | Changes the WAM Interpreter global mobile switching center number variable, MSC, to the value provided as an argument. |
| WAM:MSCVAR | Declares to the WAM Interpreter, that a value for the WAM VAR variable MSCVAR will be supplied to the script. |
| WAM:OC value | Changes the WAM global overhead channel number variable, OC, to the value provided as an argument. |
| WAM:OPEN filename | Instructs the WAM Interpreter to open a file to which OutBuff will be saved. |
| WAM:OUTPUT filename | Instructs the WAM Interpreter to append OutBuff to the file specified. |
| WAM:OUTPUTOFF | Causes the WAM Interpreter to not generate any (in this WAMIL embodiment) output messages to the script WAMIL report file for all (for this particular embodiment of WAMIL) general WAM Interpreter commands executed within the script. |
| WAM:OUTPUTON | Causes the WAM Interpreter to generate all (for this particular embodiment of WAMIL) output messages to the script WAMIL report file for all (for this particular embodiment of WAMIL) WAM Interpreter commands executed within the script. |
| WAM:PAUSE string | Instructs the WAM Interpreter to stop execution of the WAMIL script and prompt the user for continuation or termination. |
| WAM:PH value | Changes the WAM global phase number variable, PH, to the value provided as an argument. |
| WAM:PL value | Changes the WAM global pilot level number variable, PL, to the value provided as an argument. |
| WAM:PRINT string | Instructs the WAM Interpreter to print the string provided in the script WAMIL report file. |
| WAM:PUTAPX dbformname dbfilename | Instructs the WAM Interpreter to replace the APXRCV DB form, provided as an argument, with the DB filename provided. |
| WAM:PUTAPXFLD dbformname dbfilename | Instructs the WAM Interpreter to replace the APXRCV DB form field name, provided as an argument, with the current value of the WAM VAR variable APXVAR. |
| WAM:PUTS path filename string | Instructs the WAM Interpreter to append the string provided to the filename located at path. |
| WAM:RA value | Changes the WAM global radio number variable, RA, to the value provided as an argument. |
| WAM:RALIST value | Declares to the WAM Interpreter, that a list of WAM VARn RA numbers will be supplied to the script. |
| WAM:RAVAR | Declares to the WAM Interpreter, that a value for the WAM VAR variable RAVAR will be supplied to the script. |
| WAM RAVARn | Instructs the WAM Interpreter to set the WAM global RA variable to the value of the referenced WAM VARn RA variable, in position n, of the RA List passed as an argument. |
| WAM:REPORT string | Instructs the WAM Interpreter to name the script WAMIL report file as the string provided as an argument. |

-continued

| WAM COMMAND: | PURPOSE: |
| --- | --- |
| WAM:RESTOREWAM | Restores all (for this particular embodiment of WAMIL) WAM Interpreter variables, flags, and states to the values and states saved by the previous execution of the SAVEWAM command. |
| WAM:RG value | Changes the WAM global reference generator number variable, RG, to the value provided as an argument. |
| WAM:RPT value | Changes the WAM global diagnostics repeat number variable, RPT, to the value provided as an argument. |
| WAM:SAVEWAM | Saves all (for this particular embodiment of WAMIL) current WAM Interpreter variables, flags, and states. |
| WAM:SEND interface string | Instructs the WAM Interpreter to send string to the interface provided as an argument. |
| WAM:SET globalcariable value | Instructs the WAM Interpreter to assign the value given to the WAM global variable, globalvariable, and enable an association if value references a WAM VAR variable. |
| WAM:SETLISTVAR varlist1 varlist2 | The SETLISTVAR command instructs the WAM Interpreter to assign the values of varlist2 to varlist1. |
| WAM:SETVAR varvariable value | The SETVAR command instructs the WAM Interpreter to assign the value provided as an argument to the WAM VAR variable, varvariable. |
| WAM:SG value | Changes the WAM global server group number variable, SG, to the value provided as an argument. |
| WAM:SPOOL seconds | Changes the WAM Interpreter spooler input pause to the time provided, in seconds. |
| WAM:SU value | Changes the WAM global setup radio number variable, SU, to the value provided as an argument. |
| WAM:SW value | Changes the WAM global switch identification number variable, SW, to the value provided as an argument. |
| WAM:TIME | Prints the current system time in the script WAMIL report file. |
| WAM:TIMEOUT seconds | Changes the WAM Interpreter overall time out variable, TimeOut, to the value provided as an argument. |
| WAM:TIMER action | Instructs the WAM Interpreter to perform a specified internal timer action, and update the TIMER variable accordingly. |
| WAM:TP value | Changes the WAM global traffic path number variable, TP, to the value provided as an argument. |
| WAM:TRACE options | Activates the WAM Interpreter TRACE feature specified by the TRACE options. |
| WAM:TRACEOFF | Stops output to the WAMI TRACE xterm window. |
| WAM:TRACEON | Starts output to the WAMI TRACE xterm window. |
| WAM:TRKGRP value | Changes the WAM global trunk group number variable, TRKGRP, to the value provided as an argument. |
| WAM TRKMBR value | Changes the WAM global trunk member number variable, TRKMBR, to the value provided as an argument. |
| WAM:UNIX command | Instructs the WAM Interpreter to execute the command provided as a UNIX executable program. |
| WAM:VRADPC value | Changes the WAM global voice radio power control option number variable, VRADPC, to the value provided as an argument. |
| WAM:VRN value | Changes the WAM global voice radio number variable, VRN, to the value provided as an argument. |
| WAM:WAIT seconds | Instructs the WAM Interpreter to wait a specified number of seconds before execution of the next WAMIL script command. |
| WAM:WAM string | Changes the Interpreter global variable WAM value, WAM, to the value provided as an argument. |
| WAM:WAMLIST string | Declares to the WAM Interpreter that a list of values will be supplied to the script. |
| WAM:WAMVAR promptstring | Declares to the WAM Interpreter, that a value or string for the WAM VAR variable WAMVAR will be supplied to the script. |
| WAM:WAMVARn | Instructs the WAM interpreter to set the global variable WAM to the value of the referenced WAM VARn WAM variable, in position n, of the WAM List passed as an argument. |
| WAM:WMMI start stop rate mobiles message | Instructs the WAM Interpreter to generate paging messages to specified mobile units at a specified rate. |
| WAM:WMMI_GET wmmiparameter varvariable | Instructs the WAM Interpreter to get the WMMI project parameter value, defined by the argument wmmiparameter, and place the value in the WAM VAR variable, varvariable. |

-continued

| WAM COMMAND: | PURPOSE: |
|---|---|
| WAM:WMMI_SEND wmmicommand value | Instructs the WAM Interpreter to send the specified WMMI command to the active WMMI project. |
| WAM:WMMI_STOP | Instructs the WAM Interpreter to terminate the active WMMI pagging project. |
| WAM:XMITC value | Changes the WAM global transmitter control action option number variable, XMITC, to the value provided as an argument. |

WAMI Variables Initial States

This section lists and describes all (for this particular embodiment of WAMIL) the predefined WAMI variables that exist on the platform, and their initial states upon an initial start-up of the WAM. These variables are also returned to their initial states upon the execution of a WAM:INITIALIZE WAMIL command.

The following is a brief listing of the name, value, and description of WAM variables:

TABLE 1

WAM Global Variables

| VARIABLE | DEFAULT VALUE | TYPE | DESCRIPTION |
|---|---|---|---|
| ADDCE | 0 | Integer | Number of Channel Elements to add. |
| ADRS | NULL | String | Memory Address |
| AFAIL | 0 | Integer | APXRCV failure flag |
| ANT | 0 | Integer | Antenna face Number |
| AU | 1 | Integer | Cell Amplifier Unit Number |
| BBA | 1 | Integer | BCR-BIU-ACU Trio Number |
| CAT | 0 | Integer | Clock and Tone Board Number |
| CCC | 1 | Integer | CDMA Cluster Controller Number |
| CCU | 1 | Integer | CDMA Channel Unit Number |
| CDMADPC | 0 | Integer | BBA Power Control Option |
| CELL | 0 | Integer | Cell Site Number |
| CELL_TYPE | SERIESII | string | Cell Site Equipment Type |
| CFAIL | 0 | Integer | Interface Connection Flag |
| CGSA | 0 | Integer | Cellular Geographic Service Area |
| CONFIG | 0 | Integer | Cell Configuration Option |
| CSC | 0 | Integer | Cell Site Controller |
| DCCH | 0 | Integer | Dedicated/Digital Control Channel |
| DCS | 0 | Integer | Digital Cellular Switch Number |
| DisplayDelay | 1 | Integer | Script Display Window Delay |
| DL | 0 | Integer | Cell Site Data Link |
| DS1 | 0 | Integer | Digital Service 1 Number |
| ECP | 0 | Integer | Executive Cellular Processor Number |
| ERR | 0 | Integer | WAM Interpreter exit value |
| GEN | 0 | String | Generic Number/Name |
| INACT | 60 | Integer | Interface Session Inactivity (Minutes) |
| LAC | 0 | Integer | Cell Linear Amplifier Circuit Number |
| LC | 0 | Integer | Cell Locate Radio Number |
| LFAIL | 0 | Integer | Interface Login Flag |
| LMT | 0 | Integer | Lightwave Microcell Transceiver Number |
| LOOPERcnt | 1 | Integer | WAMI script looping counter |
| LOOPER | 1 | Integer | WAMI script looping limit |
| MICROCELL | 0 | Integer | FLEXANT RCS Number |
| MSC | 0 | Integer | Mobile Switching Center Number |
| OC | 0 | Integer | Overhead Channel Number |
| PH | 0 | String | TI Specified Phase Number(s) |
| PL | 0 | Integer | Pilot Level Number |
| RA | 0 | String | Cell Radio Number |
| REL | 8.0 | String | Current software release |

TABLE 1-continued

WAM Global Variables

| VARIABLE | DEFAULT VALUE | TYPE | DESCRIPTION |
|---|---|---|---|
| RG | 0 | Integer | Cell Reference Generator Number |
| RPT | 0 | Integer | TI Repeat Diagnostics Number |
| RptName | None | String | Script Report Name |
| SDPFAIL | 0 | Integer | SDP interface failure flag |
| SDPPORT | 0 | Integer | SDP port flag |
| SG | 0 | Integer | Server Group Number |
| SPOOL | 10 | Integer | WAMI Spooler Pause (Seconds) |
| SU | 0 | Integer | Cell Setup Radio Number |
| SW | 0 | Integer | Switch Identification Number |
| TFAIL | 0 | Integer | Interface Command Time Out Flag |
| TimeOut | 30 | Integer | WAMI Interface Time Out (Seconds) |
| TP | 0 | Integer | Traffic Path Number |
| TRACE | 0 | Integer | WAMI TRACE Flag |
| TRKGRP | 0 | Integer | Trunk Group Number |
| TRKMBR | 0 | Integer | Trunk Member Number |
| VRADPC | 0 | Integer | Voice Radio Power Control Option |
| VRN | 0 | Integer | Voice Radio Number |
| Wait | 10 | Integer | WAMI Script Execution Pause (Seconds) |
| WAM | 0 | String | WAM Interpreter global variable |
| XMITC | 0 | Integer | Transmitter Control Action Option |

WAMIL IF THEN ELSE Type of If-Construct Requirements

This section describes the WAMIL IF test expressions which can be used in an IF THEN ELSE Type of if-construct to test the results of a WAMIL interface command that have been stored in the buffer OutBuff, and execute a specified WAMIL command if the test result is true, or false.

An example WAMIL IF THEN ELSE type of if-construct is structured as follows:

IF:GENERIC a34y12.0t
THEN:PRINT Pass
ELSE:CONTINUE

Here, GENERIC a34y12.0t is the actual WAMIL test expression, PRINT is the WAMIL command (for which the text string "Pass" is the argument to be printed) that is executed if the results of the test are true, and CONTINUE is the WAMIL command executed if the results of the test are false, all (for this particular embodiment of WAMIL) WAMIL IF THEN ELSE constructs must (for this particular embodiment of WAMIL) be complete, and include an IF, and at a minimum a THEN and an ELSE. The WAM interpreter preferably will not accept incomplete IF THEN ELSE constructs. Any (in this WAMIL embodiment) incomplete IF THEN ELSE construct will preferably generate a syntax error from the WAM interpreter.

The WAM interpreter supports IF test expressions for all (for this particular embodiment of WAMIL) WAMIL interface commands outputs. A WAMIL IF test expression shall signify a specific test which shall be evaluated against the contents of the WAM interpreter output buffer OutBuff, or the state of a flag or value of a variable. In the case of a variable or flag, this test is evaluated against the current WAM variable value or flag state. For example, if the above WAMIL IF THEN ELSE construct is executed, the test expression GENERIC a34y12.0t would test if the specified generic load number is equal to the current WAMI generic variable setting, for the current WAMI cell variable.

The following is a list of WAMIL IF keywords, and WAMIL THEN and ELSE commands:

| | PURPOSE: |
|---|---|
| IF CONSTRUCTS: | |
| IF:ACTIVITY string | Tests if the activity for the current CELL is equal to the string provided as an argument. |
| IF:AFAIL string | Tests if the execution if the last WAMIL APXRCV command failed. |
| IF:APXVAR operator string | Tests the value of the WAM VAR variable APXVAR. |
| IF:CFAIL | Tests if a disconnect occurred during a CONNECT command execution, or a WAM interface command execution. |
| IF:COMPLETED | Tests if a completion message was returned for the previous WAMIL interface command executed. |
| IF:GENERIC string | Tests if the generic for the current CELL is equal to the string provided as an argument. |
| IF:LASTTEST | Tests if the WAMIL script has been executed for the last cell. |
| IF:LFAIL | Tests if a login attempt failed during execution of a CONNECT command. |
| IF:OMSG string | Tests if the string provided was returned for the previous WAMIL interface command executed. |
| IF:SDPFAIL | Tests if an SDP interface command execution or connection attempt failed. |
| IF:SDPPORT | Tests if a login attempt to an SDP port failed due to unavailable ports. |
| IF:SDPVAR_COLOR operator string | Tests if the COLOR of the SDPVAR indicator is equal to, or not equal to, a valid, pre-defined color. |
| IF:SDPVAR_STATE operator string | Tests if the STATE of the SDPVAR indicator is equal to, or not equal to, a valid, pre-defined state. |
| IF:SDPVAR_VALUE operator string | Tests the VALUE of the SDPVAR indicator. |
| IF:TEST_EXPR string1 operator string2 | Instructs the WAM Interpreter to perform a relational comparison between string1 and string2. |
| IF:TFAIL | Tests if a no input message was received from the last WAMIL interface command executed. |
| IF:WAMVAR operator string | Tests the value of the WAM VAR variable WAMVAR. |
| THEN/ELSE COMMANDS: | |
| THEN:CONTINUE | Instructs the WAM Interpreter to execute the next WAMIL script command. |
| THEN:ENDTEST | Instructs the WAM Interpreter to terminate the WAMIL script. |
| THEN PRINT string | Instructs the WAM Interpreter to print the string provided in the WAMIL report file. |
| THEN:TIMEOUT value | Changes the WAM Interpreter global TimeOut variable, TimeOut, to the value provided as an argument. |
| THEN:WAIT value | Instructs the WAM Interpreter to wait a specified number of seconds before execution of the next WAMIL script command. |
| THEN:WAITQUERY seconds TI value | Instructs the WAM Interpreter to wait a specified number of seconds and then query the TI interface up to a total amount of queries defined by value. |

IF THENDO ELSEDO ENDIF Type of If-Construct

This section describes the WAMIL IF THENDO ELSEDO ENDIF type of if-construct which can be used with any (in this WAMIL embodiment) IF construct commands to execute a group of commands based upon the results of the IF test expression.

A WAMIL IF THENDO ELSEDO ENDIF construct is structured as follows:

IF:GENERICa34y12.0t
    THENDO:
        WAM:PRINT The generic for the cell is valid.
        IF:ACTIVITY NO
        THEN:PRINT No activity on current cell.
        ELSE:ENDTEST
    ELSEDO:
        WAM:PRINT Generic on cell is incorrect.
        WAM:ENDTEST
    ENDIF:

All (for this particular embodiment of WAMIL) the commands between the THENDO and ELSEDO constructs are executed if the result of the IF command execution is TRUE, and all (for this particular embodiment of WAMIL) the commands between the ELSEDO and ENDIF are executed if the result of the IF command execution is FALSE.

All WAMIL IF THENDO ELSEDO ENDIF constructs must (for this particular embodiment of WAMIL) be complete and include an IF, a THENDO, an ELSEDO, and an ENDIF. The WAM interpreter will not accept incomplete constructs. Any (in this WAMIL embodiment) incomplete construct will generate a syntax error from the WAM interpreter.

Any WAMIL IF THEN ELSE constructs can be nested within any (in this WAMIL embodiment) THENDO ELSEDO, or ELSEDO ENDIF construct. Also, IF THENDO ELSEDO ENDIF constructs can be nested within other IF THENDO ELSEDO ENDIF constructs, as desired.

WAMIL Script Execution Process

A user can execute the script by selecting Run script from the WAM Graphical User Interface (GUI) Main Menu TOOLS pull down menu or from a command line, e.g., such as facilitated by the fourth copending application mentioned above. Once the Run Script Command is selected, it will appear in the Current Selected command box below the pull down menu.

A user can then simply select the Execute Command button, and the WAMIL script will be executed, after the WAM GUI has prompted the user for confirmation When a WAMIL script is executed, the WAM GUI passes the script to the interpreter, and the test is launched as a stand-alone process. From that point forward, the WAM GUI session is independent of the script execution, or any existing execution. The WAM interpreter preferably handles the execution of the script and placement of the script output file independently of the WAM GUI platform, as specified by the user before the script was launched.

Prior to launching a WAMIL script, the WAM GUI will however search through the selected WAMIL script file and check for any WAMIL variables which need to be passed as arguments to the interpreter prior to the script execution. The WAMGUI will then prompt the user for each needed variable prior to launching the script, and pass the values to the WAM interpreter as needed, along with the script name.

Once a script has been launched, the WAMGUI will update the WAMGUI CURRENT SELECTIONS display with the script name, script report name, and the script status state. The script report name shall be the WAMIL script name unless a report filename has been defined within the selected WAMIL script.

For each executed WAMIL script, the WAM will add an entry into the WAMIL exec.wam file.

The WAMIL script status states are preferably defined as follows.

| WAMIL SCRIPT STATE: | STATE DESCRIPTION: |
|---|---|
| Aborted | The WAMIL script has been aborted by the user. |
| Completed | The WAMIL test script execution has completed. The WAM status does not display script execution completion states. This state is displayed by the WAM interpreter. |
| Error | A error has occurred in the process of executing the WAMIL script. The WAM status display does not display a WAMIL script execution error state, nor any errors associated with its execution. Rather, this state, and all (for this particular embodiment of WAMIL) associated errors, are displayed by the WAM interpreter. Note. Not all (for this particular embodiment of WAMIL) script execution errors cause immediate termination of the script. |
| Executed date | The WAMIL script has been executed (launched), where date, is the system date and time upon execution. |
| None | The current selected script, if any, is not in any specific state. |
| Running | The WAMIL script execution is in progress. This state is only displayed by the WAM interpreter during the script execution. |
| Scheduled date | The WAMIL script execution has been scheduled for the date and time specified. |

The WAMGUI may not display all of the above status states, but the WAM interpreter can display any of these states during the execution of a WAMIL script. The WAMGUI CURRENT SELECTIONS display however, will remain unchanged until the execution of another script, or a script is aborted.

WAMIL Script Abort Process Requirements

A WAMIL script execution in progress can be aborted at any (in this WAMIL embodiment) time through the WAMGUI platform. This is preferably be the only (for this particular embodiment of WAMIL) method through which a script can be aborted. Alternatively, the WAM interpreter can also have the capability to abort a script, through the script status display window.

A WAMIL script in execution should be aborted through either of these processes otherwise not all (for this particular embodiment of WAMIL) existing children of a launched WAMIL script may be terminated. If other ways are used to abort a script, other than those provided by the WAMGUI or the interpreter, existing processes and connections may not be terminated.

To abort a WAMIL script, a user must (for this particular embodiment of WAMIL) select the Scripts Status . . . command from the WAMGUI Main Menu TOOLS pull down menu. Upon selection, the WAMGUI Scripts Status window will appear.

The WAM GUI Scripts status window displays the history of the current user WAMIL scripts which have been executed over time, in the following format:

date scriptname scriptstate

Where date, is the system date and time the WAMIL script was executed, or scheduled to be executed, in the format YY:MM:DD:HH:mm:SS., where YY is the two digit year, MM is the two digit month, DD is the two digit day, HH is the two digit hour, mm is the two digit minute, and SS is the two digit seconds, and, scriptname is the WAMIL script name, and scriptstate is the current status state of the WAMIL script. This information is displayed in the SCRIPTS STATUS list box. The script names are listed in alphanumeric order. The WAM GUI keeps other information on launched scripts, such as unique process ID numbers, but this information is not displayed to the user. This information is contained in the WAMIL exec.wam file, as explained below.

To abort a WAMIL script execution in progress, a user simply double clicks on the desired WAMIL script name in the SCRIPTS STATUS list box. The script name will then appear at the bottom of the window. The user then selects the Abort command button, and the WAM GUI will terminate the script, and all its child processes and related connections, after prompting the user for verification.

The SCRIPTS STATUS display list box is then immediately updated with the new state of the selected script. Only (for this particular embodiment of WAMIL) WAMIL scripts which are in a state of Running or Scheduled can be aborted.

The WAM GUI scripts history log shows the complete history of all WAMIL scripts executed by the user via the WAM GUI. This history log is continuously appended to by the WAM GUI every time a WAMIL script is executed, and can grow to a large size over time. The executed scripts history log file is called wam.testlog, and is kept in the users HOME wam.wamil sub-directory. The format of the wam.testlog file is the same as the information displayed in the SCRIPTS STATUS list box, but also contains additional information, such as the user of the script and system being used. There is one line in the wam.testlog file for each executed WAMIL script.

A user can save the wam.testlog history file under a different name, at which point the WAM GUI will start a new wam.testlog history file upon execution of a new WAMIL script, or purge all WAMIL scripts with Completed states from the file, therefore shortening the file. Once a log file has been purged of Completed states, the information can no longer be recovered. So it is good practice to save the file.

To save the history log file, a user simply selects the save history button. Upon selection of this button, the text entry box below the button will be enabled. (This button is always selected by default by the WAM GUI upon initial display of the WAM GUI Scripts status display window).

The user then simply enters a new history log file name and executes the save/clear command button. The wam.testlog file is automatically renamed to the new filename specified in the text entry box. A new wam.testlog file will be created upon the next WAMIL script execution.

To purge the history log file of all completed scripts, a user selects the Clear History button. Upon selection of this button, the text entry box is disabled. The user then simply executes the save/Clear command button and the wam.testlog history file is purged of all completed scripts. Prior to purging the log file, the WAM GUI will prompt the user for verification.

WAMI Environment Structure Requirements

This section describes the WAMI software environment and user setup requirements. The WAMI is preferably capable of full functionality within a UNIX Open Windows environment, and should be easily accessible from the user's Open Windows menu.

The following example WAMI home files and sub-directories should preferably exist:

| WAM FILES OR SUB-DIRECTORIES | DESCRIPTION |
|---|---|
| WAM | The WAM GUI main program. |
| WAMI | The WAM interpreter program. |
| WAMbin | Executable programs used by WAMI |
| WAMlib | A WAM sub-directory which contains all WAMI libraries, procedures, and executable scripts, programs and GUI libraries. |
| WAMsetup | The WAMI setup script which must (for this particular embodiment of WAMIL) be executed upon login to setup and export all WAMI variables and paths. |
| wam.apxforms | A WAM GUI file which contains a list of APXRCV DB forms supported by the WAM GUI APXRCV function. |
| wam.bba | A list of valid BBA numbers. |
| wam.cat | A list of CAT numbers. |
| wam.ccc | A list of valid CCC numbers. |
| wam.ccu | A list of valid CCU numbers. |
| wam.cells | A WAMI file which contains a list of MSC and corresponding cell numbers supported by the WAMI. |
| wam.colors | A WAM GUI file which contains a list of all the GUI colors supported by the WAM GUI. |
| wam.fonts | A WAM GUI file which contains a list of all the GUI fonts supported by the WAM GUI. |
| wam.msc | A list of valid MSC numbers. |
| wam.users | A WAMI file which contains a list of all the authorized WAMI users. This file exists simply as a means of tracking WAMI users which have undergone training and demonstration sessions. |
| wam.vars | The WAM GUI & WAMI main global variables and arrays file. This file also contains variables which can be used as command line arguments by the WAM GUI to call up and execute other existing tools. |

Syntax and Variable Consistency Checking

Figure 2B:
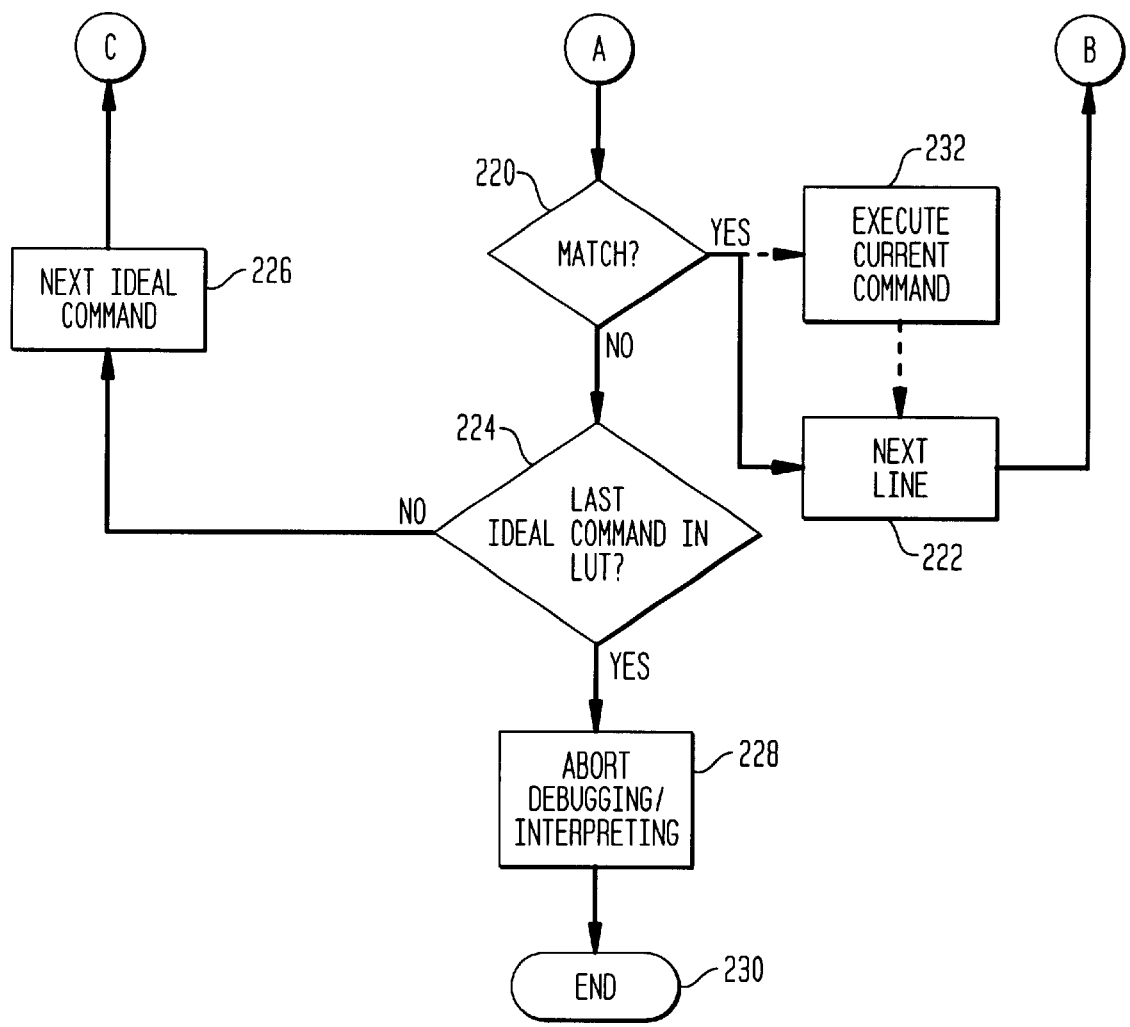

FIGS. 2A and 2B represent a flow chart that depicts an example implementation of the syntax and variable value consistence checking that is performed by the scriptor according to the invention. Flow starts at step 202 and proceeds to step 204 where the script is provided. Flow then proceeds to step 206 where the scriptor examines the current (here, the first) line of the script. Flow proceeds to step 208 where the scriptor determines the interface identified in the line under consideration.

It is to be recalled that WAMIL commands take the format of a text string preferably having the format:interface:command. The memory 404 of the system 400 has a look-up table storing the text strings associated with each of the interfaces, e.g., TI, WAM and SDP. The processor 402 treats the script line under consideration as a text string and compares each entry in the look-up table against the text string. When a match is found, this identifies the interface involved.

Flow proceeds from step 208 to 210 of FIG. 2A, where the set of permissible commands for the identified interface is retrieved. Each of the interfaces has a set of permissible commands stored in the memory 404.

Flow proceeds from step 210 to step 212 in FIG. 2A. In step 212, the processor 402 strips the interface identifier string and connective alphanumeric character, e.g., ":", from the current script line to form a current command string. Flow then proceeds to step 214, where the processor 402 retrieves a first ideal command string. Flow proceeds to step 216 where the processor 402 substitutes the current values for any variables listed as arguments in the ideal command string to form an updated ideal command string.

Flow proceeds from step 216 to step 218 in FIG. 2A, where the processor 402 compares the current command string to the updated ideal command string. Flow proceeds to step 220 of FIG. 2B, where it is determined whether these two text strings match. If so, then the syntax is correct and the values for the variables used by the command are consistent with the values for these variables set previously in the script. When a match is found, flow proceeds from step 220 to step 222, where the processor 402 sets the next line in the script to be the current line. Flow then proceeds back up to step 206.

If a text string match is not found in step 220 of FIG. 2B, flow proceeds to step 224. There, it is determined whether the ideal command under consideration is the last ideal command in the set. If not, then flow proceeds to step 226 where the processor sets the next ideal command to be the current ideal command. Flow proceeds from step 226 in FIG. 2B back up to step 214 in FIG. 2A. But if it is determined in step 224 that the last ideal command has failed to produce a match, then flow proceeds to step 228, where the processor 402 aborts debugging. Flow proceeds to step 230, where the syntax and variable consistence checking procedure terminates.

FIGS. 2A and 2B have been described in terms of the syntax and variable value consistence checking performed by the scriptor according to the invention during debugging. This same set of steps is performed by the interpreter when it interprets commands during execution of a script, with one main difference. According to the scriptor, flow proceeds from step 220 to step 222 when a match is found. According to the interpreter, flow proceeds from step 220 to step 232, where the command under consideration is interpreted/executed. Flow then proceeds from step 232 to 222. From step 222 the flow is the same as described above relative to the scriptor. Also, in step 230, if it is necessary to abort, the interpreter aborts the interpreting procedure rather than aborting the debugging procedure.

FIG. 3 depicts an example of a procedure followed by the scriptor to propagate, throughout the entire script, changes that have been made to a line of the script. Flow starts at step 302 and proceeds to step 304, where a script to be edited is provided. Flow proceeds to step 306, where the user selects for editing a command that sets the value of a variable. Preferably, but not necessarily, the changes desired by the user are made using a graphical user interface (GUI). Flow proceeds to step 308, where the user actually changes the value of the variable being set by the chosen command.

Flow proceeds from step 308 in FIG. 3 to step 310. In step 310, the processor 402 regenerates the entire script to update other command arguments that correspond to variable whose value was updated in step 308. Flow proceeds to step 312, where it is determined whether another command is to be edited. If so, flow proceeds to 314, where the next command to be edited is chosen. From there, flow proceeds back up to step 308. If no other command is to be edited at step 312, then flow proceeds to step 316 where the edit propagation procedure terminates.

Examples of operation of the scriptor and/or interpreter according to the invention follow. First, consider the script discussed in the background section of this application, i.e., Script No. 1. If this script were debugged using the scriptor according to the invention or interpreted using the interpreter according to the invention, the debugging/interpreting would abort because the value used for variable "cell" in line 5 (namely, 101) is not the same as the value for the variable "CELL" set in line 2 (namely, 123).

Now consider a variation of the example script in the background section.

Script No. 2

| Line | Command |
| --- | --- |
| 01 | WAM:MSC 5 |
| 02 | WAM:CELL 49 |
| 03 | WAM:BBA 8 |
| 04 | WAM:CONNECT TI |
| 05 | TI:op:cell 49, bba 8 |
| 06 | WAM:DISCONNECT TI |
| 07 | WAM:ENDTEST |

04 WAM:CONNECT TI
05 TI:op:cell 49, bba 8
06 WAM:CONNECT TI
07 WAM:ENDTEST

Script No. 2 is again written in the WAMIL language and deals with cell number 49 of the mobile switching center (MSC) number 5. It connects (or establishes) a TI session, issues the op:cell command embedded in line 5 and then disconnects or terminates the session. If the user intended at line 5 to deal with the circuit board BBA No. 1 instead of BBA No. 8, then the script would not need line 3 because the default value for the variable BBA in the WAMIL language is set to equal 1. But because line 5 was written as "TI:op::cell 49, BBA 8,", than the scriptor debugging the script or the interpreter interpreting the script would abort without line 3. They would abort because the value for the variable BBA that is being set in the embedded command of line 5 is not consistent with the default value for the variable BBA in the WAMIL language and because there would be no intervening command to affirmatively set the value of the variable BBA to No. 8. Similarly, if line 5 recited BBA 9 instead of BBA 8, then the scriptor or interpreter would abort because of the inconsistency.

If a user were to edit this script to change the value of the variable in line 2 from 49 to 101 then the scriptor would propagate this change throughout the script. Here, the scriptor would change the value of the variable "cell" in the embedded command of line 5 from 49 to 101 without involving the user in that update. In other words, the scriptor would automatically propagate the change from line 2 throughout the corresponding parts of the script.

The scriptor and interpreter according to the invention, have the advantage of not only checking command syntax, but also checking that the values for the variable in any given line are set in a manner that is consistent with the values for those variables that have been set previously in the script. In scripts that are of a short length, the advantage is not as readily appreciated as in lengthy scripts. But the value in avoiding the mistakes that the invention prevents is very clear. Again, these errors are not detected by the scriptors and interpreters of the Background Art because they do not represent improper syntax. Rather, they represent instances in which values for variables are set in consistently, e.g., due to user oversight The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A method of processing an at least partially-completed script having at least one command, wherein said method checks syntax and argument consistency, the method comprising:
   a) providing a current command to be evaluated from said script, said command having a current argument;
   b) generating an ideal command from a set of permissible commands, said ideal command having an ideal argument that is consistent with preexisting values of variables identified in said script;
   c) comparing said current command against said ideal command;
   d) returning, if said step c) results in a match, to said step a) using a second command from said script;
   e) repeating, if said c) does not result in a match, said steps b) and c) for additional ideal commands until a match is found or until said set of permissible commands has been exhausted.

2. The method of claim 1, further comprising:
   f) warning, if said step e) exhausts said set of permissible commands without finding a match, of a bug in said script.

3. The method of claim 1, wherein said step b) includes:
   b1) retrieving a first string from a list of strings representing valid command syntaxes, said first string having a substring representing a variable; and
   b2) revising said first string by replacing said substring with the preexisting value of said variable.

4. The method of claim 1, further comprising:
   f) providing a line in said script, said line indicating a command and a domain in which said command is to be used;
   g) determining the domain identified by said line; and
   h) retrieving a set of permissible commands for said domain;
   wherein said step a) strips domain information from said first line to obtain said current command.

5. The method of claim 4, wherein said domain relates to a user interface to a system.

6. The method of claim 1, further comprising:
   f) returning, if a match is found via said step e), to said step a) using a second command from said script.

7. A method of editing a script having a sequence of commands, the method comprising:
   a) providing a script;
   b) selecting a command to be edited from said script, the selected command having an associated argument that sets the value of a variable;
   c) updating said associated argument of said selected command to change said value of said variable;
   wherein said script includes a second command that has a defined argument that corresponds to said variable but which does not equal the updated value of said variable; and
   d) regenerating said script to update said defined argument to equal said updated value of said variable.

8. The method of claim 7, wherein said script has at least a third command that has another defined argument that corresponds to said variable, but which does not equal said updated value of said variable, and said step c) also updates said the other argument to equal said updated value of said variable.

9. A method of interpreting each command in a script having a sequence thereof written in a high-level scripting language, wherein said method checks syntax and argument consistency, the method comprising:

a) providing a current command to be evaluated from said script, said command having a current argument;

b) generating an ideal command from a set of permissible commands, said ideal command having an ideal argument that is consistent with preexisting values of variables identified in said script;

c) comparing said current command against said ideal command;

d) executing, if said step c) results in a match, said current command;

e) returning, if said step c) results in a match, to said step 1) using a second command from said script;

f) repeating, if said step c) does not result in a match, said steps b) and c) for additional ideal commands until a match is found or until said set of permissible commands has been exhausted; and g) executing, if a match is found via said step f), said current command.

10. The method of claim 9, further comprising:

h) returning, if a match is found via said step f), to said step a) using a second command from said script.

11. The method of claim 10, further comprising:

i) aborting, if said step f) exhausts said set of permissible commands without finding a match, interpretation of said script.

12. The method of claim 9, wherein said step b) includes:

b1) retrieving a first string from a list of strings representing valid command syntaxes, said first string having a substring representing a variable; and b2) revising said first string by replacing said substring with the preexisting value of said variable.

13. The method of claim 9, further comprising:

h) providing a line in said script, said line indicating a command and a domain in which said command is to be used;

i) determining the domain identified by said line; and j) retrieving a set of permissible commands for said domain;

wherein said step a) strips domain information from said first line to obtain said current command.

14. The method of claim 13, wherein said domain relates to a user interface to a system.

15. A computer-readable medium having embodied thereon a program to be processed by a machine to debug an at least partially-completed script having a sequence of commands, wherein said computer-readable-medium-embodied program checks syntax and argument consistency, said computer-readable-medium-embodied program comprising:

a first code segment to select a current command to be evaluated from said script, said command having a current argument;

a second code segment to generate an ideal command from a set of permissible commands, said ideal command having an ideal argument that is consistent with preexisting values of variables identified in said script;

a third code segment to compare said current command against said ideal command;

a fourth code segment to return, if said third code segment achieves a match, to said first code segment using a second command from said script; and a fifth code segment to repeat, if said third codes segment does not achieve a match, said second and third codes segments for additional ideal commands until a match is found or until said set of permissible commands has been exhausted.

16. The computer-readable-medium-embodied program of claim 15, further comprising:

a sixth code segment to return, if a match is found via said fifth code segment, to said first code segment using a second command from said script.

17. The computer-readable-medium-embodied program of claim 15, further comprising:

a seventh code segment to warn, if said fifth code segment exhausts said set of permissible commands without finding a match, of a bug in said script.

18. The computer-readable-medium-embodied program of claim 15, wherein said second code segment includes:

a first code subsegment to retrieve a first string from a list of strings representing valid command syntaxes, said first string having a substring representing a variable; and a second code subsegment to revise said first string by replacing said substring with the preexisting value of said variable.

19. The computer-readable-medium-embodied program of claim 15, further comprising:

a seventh code segment to provide a line in said script, said line indicating a command and a domain in which said command is to be used;

an eighth code to determine the domain identified by said line; and a ninth code segment to retrieve a set of permissible commands for said domain;

wherein said first code segment strips domain information from said first line to obtain said current command.

20. The computer-readable-medium-embodied program of claim 19, wherein said domain relates to a user interface to a system.

21. A computer-readable medium having embodied thereon a program to be processed by a machine to edit a script having a sequence of commands, said computer-readable-medium-embodied program comprising:

a first code segment to select a command to be edited from said script, the selected command having an associated argument that sets the value of a variable;

a second code segment to update the selected argument of the selected current command to change said value of said variable;

wherein said script includes a second command that has a defined argument that corresponds to said variable, but which does not equal the updated value of said variable; and a third code segment to regenerate said script to update said defined argument to equal said updated value of said variable.

22. The computer-readable-medium-embodied program of claim 21, herein said script has at least a third command that has another defined argument that corresponds to said variable, but which does not equal said updated value of said variable, and said third code segment also updates said third argument to equal said updated value of said variable.

23. A computer readable medium having embodied thereon a program to be processed by a machine to interpret each command in a script having a sequence thereof written in a high-level scripting language, wherein said computer-readable-medium-embodied program checks syntax and argument consistency, said computer-readable-medium-embodied program comprising:

a first code segment to provide a current command to be evaluated from said script, said command having a current argument;

a second code segment to generate an ideal command from a set of permissible commands, said ideal command having an ideal argument that is consistent with preexisting values of variables identified in said script;

a third code segment to compare said current command against said ideal command;

a fourth code segment to execute, if said third code segment achieves a match, said current command;

a fifth code segment to return, if said third codes segment achieves a match, to said first code segment using a second command from said script;

a sixth code segment to repeat, if said third code segment does not achieve a match, said code second and third code segments for additional ideal commands until a match is found or until said set of permissible commands has been exhausted; and a seventh code segment to execute, if a match is found by said sixth code segment, and said current command.

24. The computer-readable-medium-embodied program of claim 23, further comprising:

an eighth code segment to return, if a match is found via said sixth code segment, to said first code segment using a second command from said script.

25. The computer-readable-medium-embodied program of claim 23, further comprising:

a ninth code segment to abort, if said sixth code segment exhausts said set of permissible commands without finding a match, interpretation of said script.

26. The computer-readable-medium-embodied program of claim 23, wherein said second code segment includes:

a first code subsegment to retrieve a first string from a list of strings representing valid command syntaxes, said first string having a substring representing a variable; and a second code segment to revise said first string by replacing said substring with the preexisting value of said variable.

27. The computer-readable-medium-embodied program of claim 23, further comprising:

a ninth code segment to provide a line in said script, said line indicating a command and a domain in which said command is to be used;

a tenth code segment to determine the domain identified by said line; and an eleventh code segment to retrieve a set of permissible commands for said domain;

wherein said first code segment strips domain information from said first line to obtain said current command.

28. The computer-readable-medium-embodied program of claim 27, wherein said domain relates to a user interface to a system.

* * * * *